(12) United States Patent
Ihle et al.

(10) Patent No.: US 7,692,355 B2
(45) Date of Patent: Apr. 6, 2010

(54) ELECTRIC MOTOR

(75) Inventors: Olai Ihle, Eckental (DE); Thomas Peterreins, Nuremberg (DE); Christian Zimmerer, Pottenstein (DE); Paul Zimmermann, Nuremberg (DE)

(73) Assignee: Buehler Motor GmbH, Nuremberg (DE)

( * ) Notice: Subject to any disclaimer, the term of this patent is extended or adjusted under 35 U.S.C. 154(b) by 326 days.

(21) Appl. No.: 11/790,819

(22) Filed: Apr. 27, 2007

(65) Prior Publication Data

US 2007/0290568 A1 Dec. 20, 2007

(30) Foreign Application Priority Data

Apr. 28, 2006 (DE) .................. 10 2006 021 242

(51) Int. Cl.
*H02K 5/04* (2006.01)
*H02K 15/14* (2006.01)

(52) U.S. Cl. ..................... 310/257; 310/43; 310/71; 310/89; 29/596

(58) Field of Classification Search .............. 310/71, 310/257

See application file for complete search history.

(56) References Cited

U.S. PATENT DOCUMENTS

| | | | |
|---|---|---|---|
| 4,381,465 A * | 4/1983 | Renkl et al. | 310/49.12 |
| 4,841,190 A * | 6/1989 | Matsushita et al. | 310/257 |
| 6,663,362 B1 | 12/2003 | Lentz et al. | |
| 7,074,019 B2 | 7/2006 | Knoll | |
| 2004/0062598 A1* | 4/2004 | Bassler et al. | 403/375 |
| 2005/0264113 A1* | 12/2005 | Suzuki et al. | 310/80 |
| 2006/0075616 A1 | 4/2006 | Bassler et al. | |
| 2007/0137351 A1 | 6/2007 | Schwendemann | |

FOREIGN PATENT DOCUMENTS

| | | |
|---|---|---|
| DE | 8017528 | 3/1981 |
| DE | 30 24 674 | 1/1982 |
| DE | 35 14 895 | 10/1986 |
| DE | 199 56 380 | 1/2001 |
| DE | 101 52 497 | 5/2003 |
| DE | 102 26 145 | 3/2004 |
| DE | 10 2004 024 702 | 9/2005 |
| EP | 1 263 115 | 12/2002 |
| WO | WO 02 45240 | 6/2002 |

\* cited by examiner

*Primary Examiner*—Burton Mullins
(74) *Attorney, Agent, or Firm*—Jacobson Holman PLLC

(57) ABSTRACT

The invention relates to an electric motor having a permanent magnetic rotor supported in a rotatable fashion around a central axis, a wound stator with a cylindrical stator winding, claw poles, perpendicular in reference to the disc-shaped stator plates and arranged around the central axis, and a tubular return ring connected to the stator plates free from play. The object of the invention is to provide an electric motor, in which the stator is composed from as few parts as possible, with its assembly being simple, its construction being robust, and being provided with an optimum effectiveness, allowing a great freedom of design and space used and thus an economical structure. This object is attained according to the invention in the disc-shaped stator plates being in one piece with the claw poles and being calked to the return ring with the disc-shaped stator plates.

15 Claims, 4 Drawing Sheets

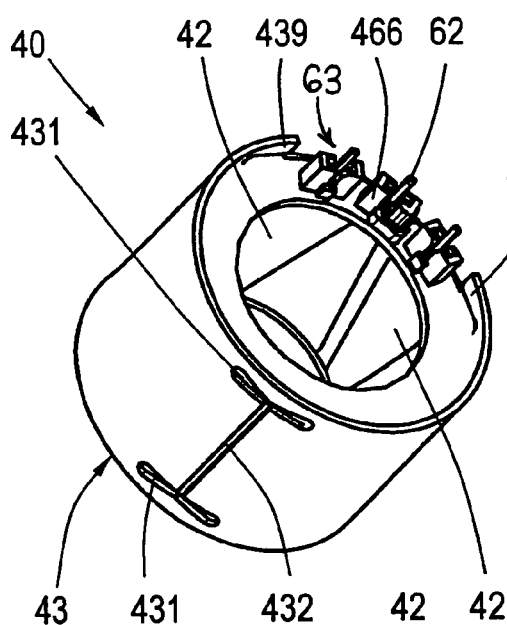
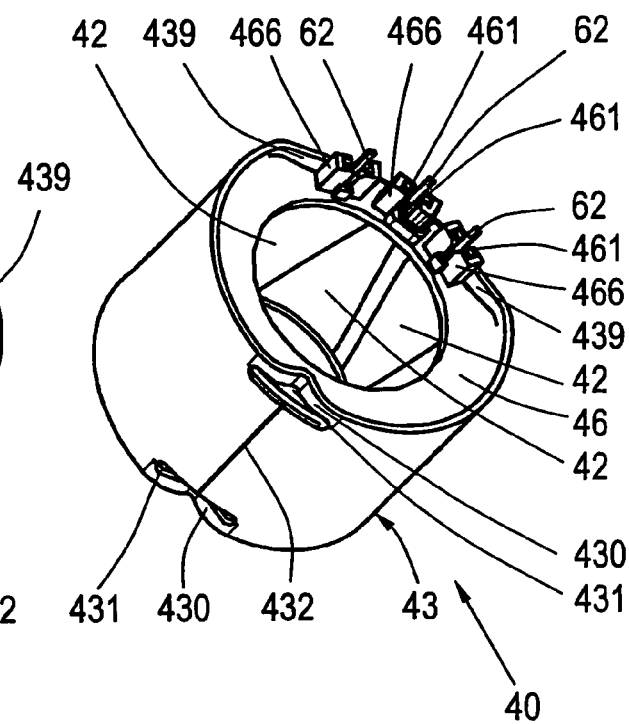
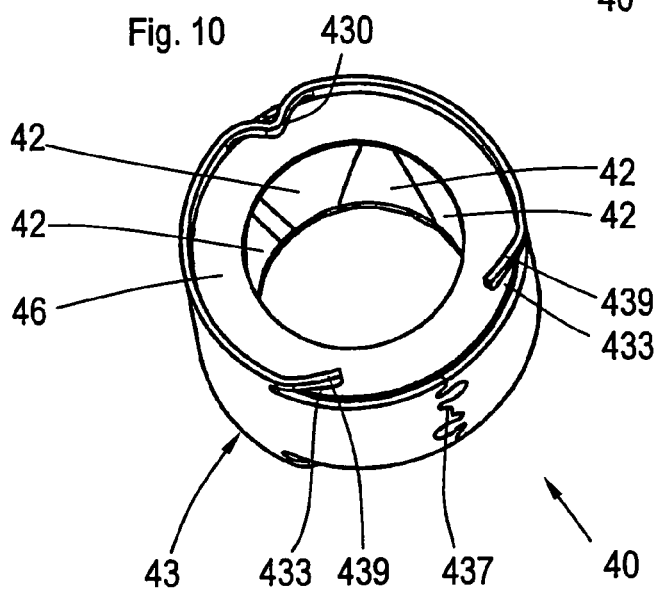

ELECTRIC MOTOR

BACKGROUND OF THE INVENTION (1) Field of the Invention

The invention relates to an electric motor with a permanent magnetic rotor supported in a rotatable manner around a central axis, a wound stator with a cylindrical stator winding, claw poles arranged perpendicular in reference to the disc-shaped stator plates and arranged around the central axis and connected to a tubular return ring, connected to the stator plates free of play.

The most frequently used way to produce claw pole stators consists of bending the claws pre-punched from a disc in the center of said disc. This way the maximum length of the claws in the axial direction is limited to approximately half the interior diameter of the stator. This limits the performance achievable by such motors and, if necessary, several stators have to be arranged in line with other.

(2) Description of the Related Art

From US 2002/0180302 A1, a generic electric motor is known. In the electric motor known the stator is composed of four parts. Here, the claw poles are punched from strip-shaped sheet metal and subsequently bent to a ring and the ends are connected to each other. Two of these bent claw pole sheet metals are subsequently assembled together with two additional stator plates. This method is relatively expensive and unreliable. The many seams additionally increase the magnetic resistance and thus reduce the effectiveness of the motor.

BRIEF SUMMARY OF THE INVENTION

The object of the invention is therefore to provide an electric motor, in which the stator comprises as few parts as possible, its assembly is easy, its structure is robust, and has an optimum effectiveness, with a large design freedom and usability of constructive space and thus an economical structure being possible.

This object is attained according to the invention in that the disc-shaped stator plates and the claw poles are embodied in one piece and the return ring is calked to the disc-shaped stator plates. This way the magnetic resistance is low and accordingly the effectiveness is high and the assembly is facilitated.

The return ring should be connected to the stator plates with as little play as possible, in order to yield a low magnetic resistance and thus a high effectiveness. Preferably the caulking of the return ring with the stator plates is achieved such that the return ring has slots at several points in its axial edge region and sheet metal bars adjacent to the slot are deformed radially inward. By the deformation the return ring is pulled inwardly onto the disc-shaped stator plates, reducing the magnetic resistance in this area. Further, the sheet metal bars form a form-fitting connection between the return ring and the disc-shaped stator plates, and thus also the claw poles in the axial direction.

From reasons of production technology V-shaped notches are provided in the disc-shaped stator plates, which are arranged at the radially exterior edge of the stator plates, with the notches converging in the direction of the center of the stator plate.

Great freedom of design choice and use of construction space is provided. In this way, an economical structure for the stator and thus for the electric motor is possible when the length of the claw poles is distinctly larger in a direction parallel to the axis than half the interior diameter of the stator.

In order to fix the claw pole and to maintain their distance from each other they shall be connected to each other via an electrically insulating plastic material. Preferably this is designed such that the claw poles are injection-molded with a plastically processed plastic material into the form of an insulating body for the stator winding.

A further embodiment of this inventive concept is suggested to embody the insulating body with quick connectors with a protrusion being provided for each adjacent winding wires at the insulating body in the axial direction, having an accepting slot for a connection wire and an assembly recess for the contact pin.

Advantageously, the insulating body is in one piece with the mounting means for a circuit board. The mounting means are here composed from a stop and a latching means. The stop determines the axial position of the circuit board in reference to the insulating body and the latching means ensure a secure fastening to the circuit board in this position, with them representing a form-fitting connection in the radial direction that can only be overcome axially with force. The circuit board is provided with recesses in their diameter adjusted to the latching means. This way the circuit board can easily and simply be fastened to the insulating body, with it being further provided that the contact pin on the one hand has a clamping-cutting geometry and on the other hand is a solder-free compression contact, electrically connected to the circuit board. By this embodiment of the contact pin, during assembly of the circuit board, simultaneously an electric connection can be created between the stator winding and the circuit board. Preferably the contact pins are compressed into it prior to the assembly of the circuit board.

The invention also comprises a rotary pump driven by an electric motor of the above-described type. When using a rotary pump, it is suggested that the insulating body is embodied in one piece with the separating can, separating the wet chamber from a dry chamber of the rotary pump. This way the insulating body can be omitted as an additional component.

In a particularly preferred further embodiment for laser light of a wave length or a wavelength range, the separating can, as a part of a second housing part, being welded to a first housing part and the separating can as a part of a second housing part being welded to a motor housing part. The first housing part or the motor housing part comprises a material absorbing the same laser light. By this arrangement it is possible to tightly and in a sealed fashion weld the first housing part with the second housing part and the second housing part with the motor housing part using the laser penetrating welding method.

The preferred method for producing claw poles has the following steps:—deep-drawing a can made from a magnetically conducting sheet metal, —radially punching out claw poles from the can, deforming the claw poles into an exact form. Here, it is advantageous that a sufficient roundness of the disc-shaped stator plates can be yielded so that a low magnetic resistance can be produced in reference to the return ring.

An advantageous method for producing claw pole stators includes the following steps: —punching out flat claw poles connected to each other via a continuous sheet metal strip, —roll-bending of the sheet metal strip, —welding the ends of the sheet metal strips together, —injection-molding the claw poles using a plastic material in the form of an insulating material body, —radially punching out bars connecting the sheet metal strips to each other, —winding the insulating body, —assembling the return ring, and caulking it to the roll-bent stator part.

BRIEF DESCRIPTION OF THE DRAWINGS

In the following, an exemplary embodiment is explained in greater detail using the drawing. It shows.

DETAILED DESCRIPTION OF THE INVENTION

Figures 1, 2:
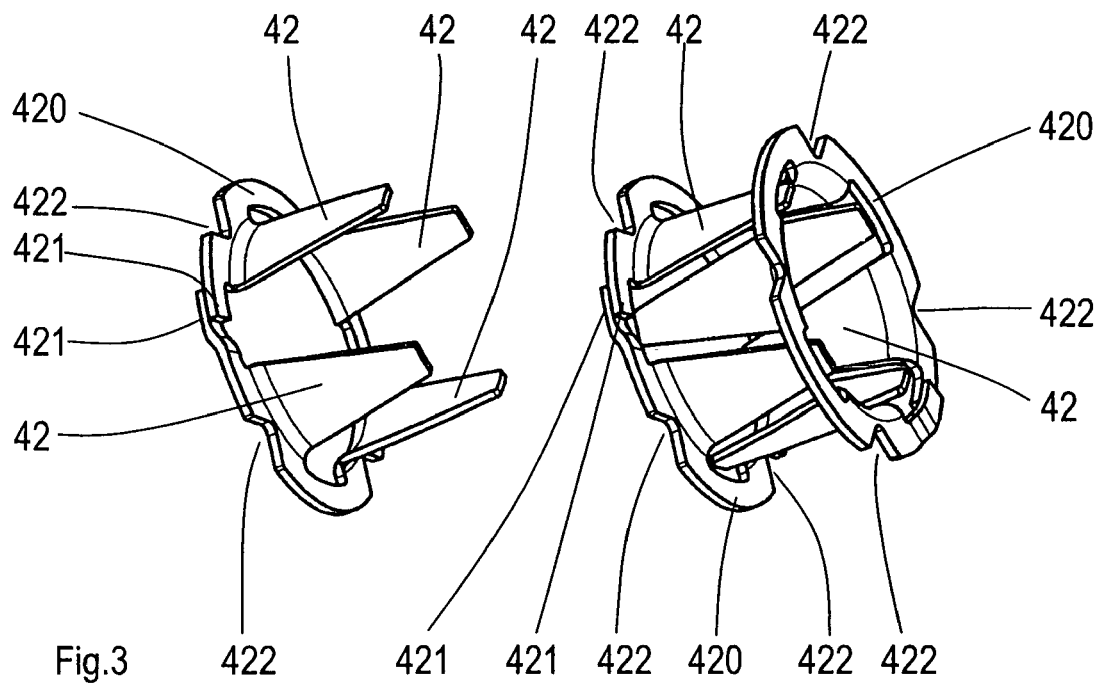
FIG. 1 a circular disc-shaped stator plate with claw poles,
FIG. 2 two stator plates separated from each other,
FIG. 3 two stator plate-sections connected to each other by sheet metal bars,
FIG. 4 a side view (from the right) of a tubular return ring,
FIG. 5 a front view of the return ring,
FIG. 6 a spatial representation of the return ring,
FIG. 7 a side view (from the left) of the return ring,
FIG. 8 a stator prior to a deformation process,
FIG. 9 a stator after the deformation process,
FIG. 10 the stator after the deformation process from a different perspective, and
FIG. 11 a cross-section through a rotary pump according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a circular disc-shaped stator plate 420 with four claw poles 42, bent at a right angle away from the stator plates 420, with the stator plates 420 having ends 421 welded to each other, overlapping. The circular disc 420 is provided at its perimeter with V-shaped recesses 422, which are arranged evenly distributed over the perimeter. The claw poles are shaped trapezoidal for reducing a detent torque, narrowing towards their free end.

In a first exemplary embodiment FIG. 2 shows two circular disc-shaped stator plates 420 with their claw poles 42 in an opposite position, with each claw pole 42 of the first stator plate 420 following a claw pole of the second stator plate 420. The two stator plates 420 are shown in their correct position; however, they are not contacting each other. In the assembled state the sheet metals are fastened by an insulating body. The insulating body, made from a material that can be processed by injection molding, is here molded around the sheet metal, with additional connecting and fasting means being formed.

Figure 3:
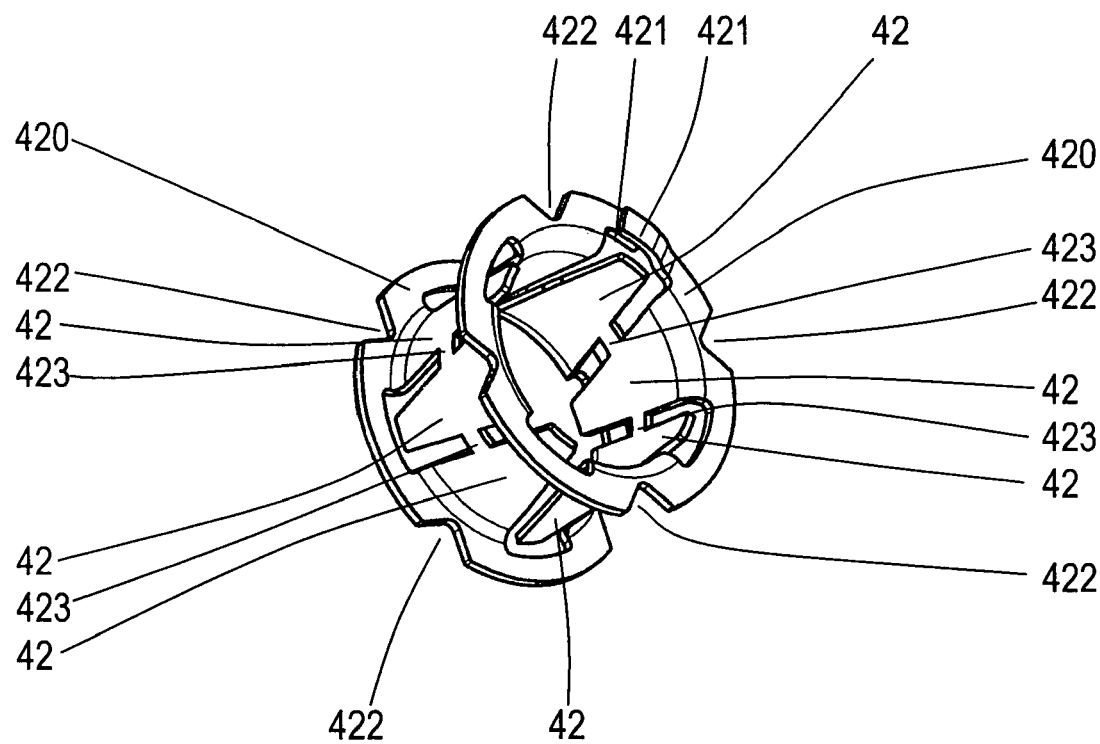

FIG. 3 shows a second embodiment of the invention, in which the stator plates 420 with the claw poles 42 are punched out of a single sheet metal strip, with the claw poles 42 being connected to each other via sheet metal bars 423. The sheet metal bars may remain in the stator in the final assembly state, if they are embodied sufficiently thin; however, they reduce the effectiveness of the motor. Here, it would be more advantageous to remove the bars. This results in a higher production expense. The geometry of the stator, with the exception of the sheet metal bars 423, is equivalent to the arrangement of FIG. 2. Two claw poles 42 are not connected to each other via sheet metal bars, but they form the ends of the sheet metal strip mentioned. The circular disc-shaped stator plates 420 are welded to each other at their ends 421 similar to FIGS. 1 and 2. The welding can occur in a device in which the interior diameter of the claw pole ring is calibrated.

Figure 4:
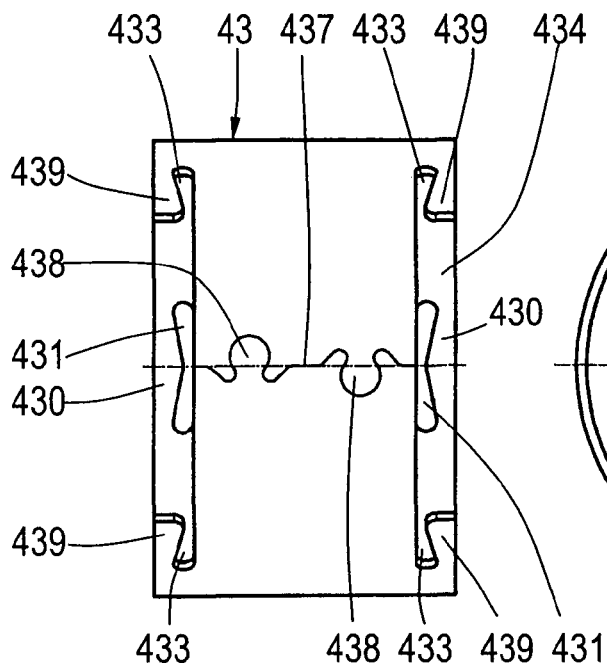

FIG. 4 shows a right side view of a tubular return ring 43, punched out of a sheet metal strip and rolled. The two ends of the sheet metal strip are connected to each other at a seam 437.

Figure 6:
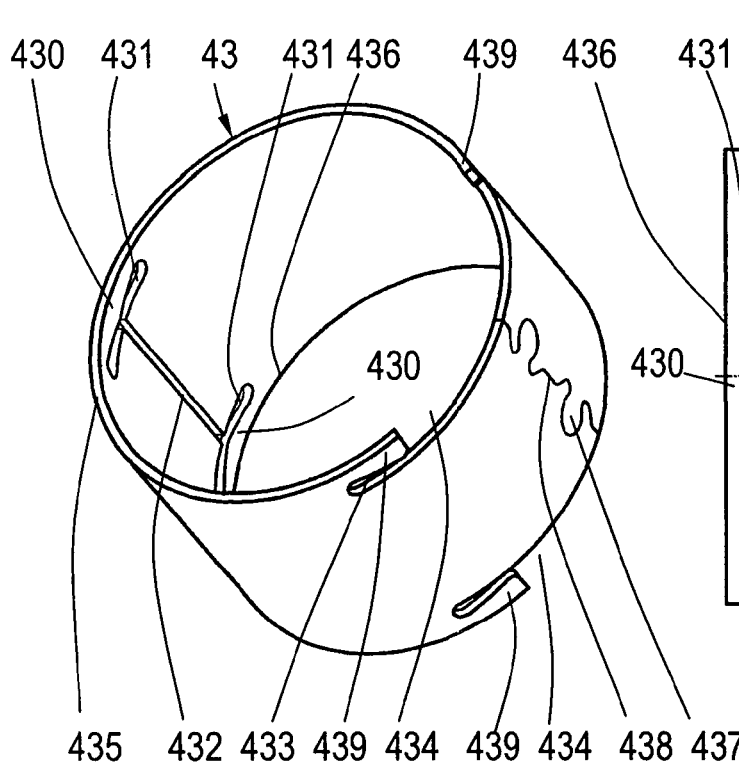
Figure 7:
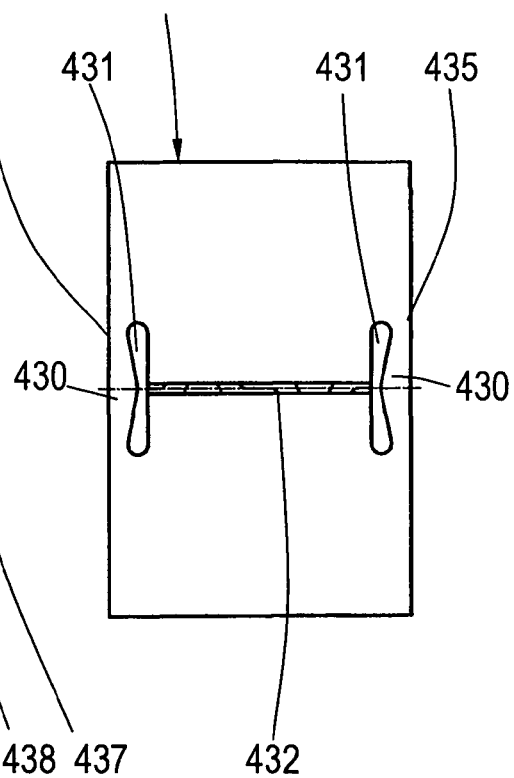

The seam is formed in the shape of form-fitting and button-shaped matching connection means 438. The return ring (here seen at its rear) is provided at the perimeter of the return and has slots 431 arranged in its edge region, narrowing towards the center and being provided at their ends with radii. As clearly discernible in FIGS. 6 and 7, two slots 431 are provided arranged in the same circumferential area but at opposite brims 435, 436. The two slots 431 are each connected to each other by a connecting slot 432, each beginning at the center of the slots 431. The slots 431 and 432 together form an H-shape. The slots 431 each separate a bar 430 from the return body. Further, FIGS. 4 and 6 show open slots 433, open towards a recess 434. Sheet metal tongues 439 form by the slots 433, serving for the axial fastening of the stator plates 420 by a radial bending (inwardly). The sheet metal bars 430 serve both for the axial fastening of the stator plates 420 as well as the reduction of the diameter of the return. By a radial deformation of the sheet metal bars 430 the connection slot 432 narrows, if necessary until the two edge regions of the connection slot 432 contact.

Figure 5:
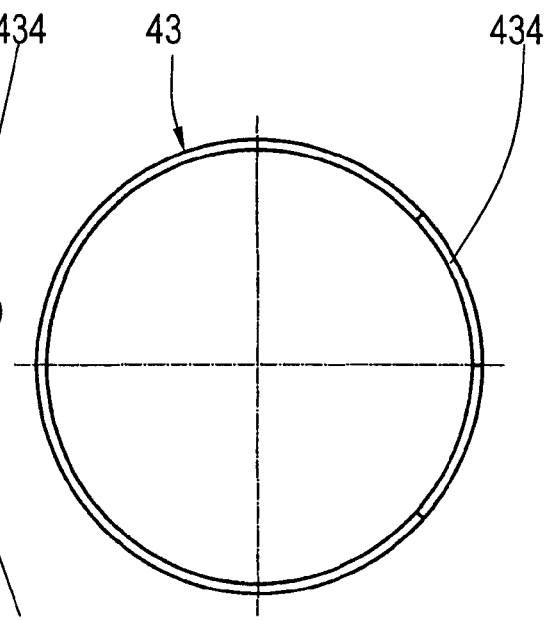

In FIG. 5 a front view of the return ring 43 is shown with a recess 434. FIG. 6 shows a spatial view of the return ring 43 and FIG. 7 a side view (from the left).

In FIG. 8 the return ring 43 is on a wound stator structure made from stator plates 420 (hidden) with claw poles 42, insulating body 46, injection molded around the stator plates, with the insulating body being provided with protrusions 466 having a receiving slot 461, in which a wire end of a stator winding is inserted and contacts a contact pin 62. In FIG. 8 a stator 40 is shown prior to the deformation process, having slots 431, the connection slot 432, the sheet metal bars 430, and the sheet metal tongues 439. A distinct distance between the two borders of the connection slot 432 is discernible in the circumferential direction of the return ring 43.

FIG. 9 shows the stator after the deformation process, with the sheet metal bars 430 being deformed radially inwardly, thus the tensile forces in the sheet metal bars 430 ensure a narrowing of the connection slot 432. Depending on the tolerance ratios of the stator structure, onto which the return is mounted, the connection slot 432 can be closed entirely or may still show a slight gap. Sheet metal tongues 439 are also bent inwardly and together with the deformed sheet metal bridges 430 form an axial fixture for the stator structure.

FIG. 10 also shows the stator after the deformation process, with sheet metal tongues 439 also being discernible from a different perspective, again bent inwardly in the deformation process. The sheet metal tongues 439 form, together with the inwardly deformed sheet metal bars 30, a reliable axial fastening of the stator structure. The slots 431 and 433 are expanded during the deformation process.

Figure 11:
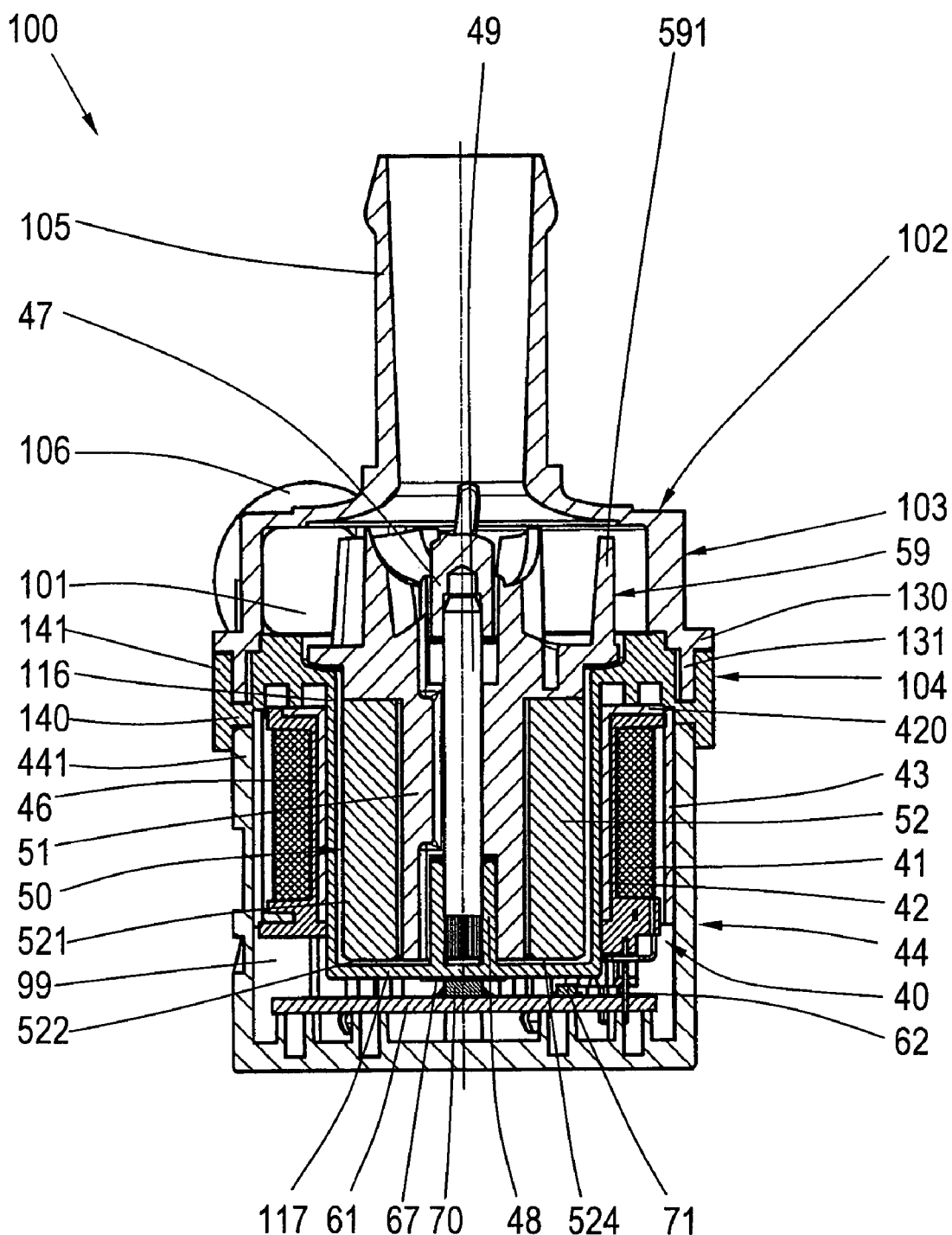

FIG. 11 shows a cross-section through a rotary pump 100 according to the invention, having a pump housing 102, comprising a first housing part 103 and a second housing part 104 adjacent thereto. A housing part 44 limits a dry chamber filled by a stator (40) of an electronically commuted direct-current motor and its control electronics. The motor housing part 44 abuts to the second housing part 102. The first and the second housing part 103, 104 limit a wet chamber 101 of the rotary pump. The second housing part 104 is formed in one piece with a separating can 116, which the wet chamber 101 from a dry chamber 99.

The wet chamber 101 includes an axis 49 implemented in a fixed manner between an axial recess 48 at the side of the separating can and an axial recess 47 at the side of the intake-socket. A beading at the end of the axle prevents a distortion of the axle 49 during the pump operation. A fixed bearing 54 is supported in a rotatable fashion on the axle 49, which is impressed into a hollow shaft 51 of the rotor 50. The shaft 51 is made in one piece with a pump wheel 59, comprising several approximately helically shaped blades 591 for transporting liquids. The faces of the fixed bearing 54 may be axially supported against the axial recess 48 at the side of the separating can and against the axial recess 47 at the side of the intake-socket, with spacers positioned intermediately. A hollow-cylindrical ferrite magnet 52 is adhered onto the hollow shaft 51, with an elastic adhesive being used inserted into four or five of the grooves 511 formed parallel to the axle in the hollow shaft.

The dry chamber 99 receives the stator 40 of the electronically commuting direct current motor 10, embodied in the form of a hollow-cylindrical stator winding 41, with their magnetic field being guided during operation via claw poles in an alternating fashion at the perimeter of the separating can 116 and interacting with the hollow cylindrical permanent magnets 52 in the wet chambers 101. The magnetic circuit is closed by a return ring 43, connected to the claw poles 42. The claw poles 42 are provided with an insulating body 46 by way of injection molding, connecting the claw poles 42 to each other mechanically but not magnetically. In the present example the stator 40 has four pairs of poles. The insulating body 46 is geometrically shaped such that the winding wires of the stator winding 41 can be connected with contact pins 62 provided with quick connectors and these quick connectors can be fastened mechanically in the insulating body 46.

At their end opposite the quick connectors 63 the contact pins 62 are formed as combination contacts and are impressed into a circuit board 61 and thus contact it. Here, the contact pins 62 include one or two compression zones that can be deformed. The circuit board 61 includes a Hall sensor 71, an integrated circuit 70 IC for switching the stator coil and a PTC for the winding protection and plug pins 64 for the power supply. The motor housing part 44 includes a plug housing 65, in which the plug pins 64 are arranged. Electronic parts with a high heat loss are cooled via heat conducting foils 67 towards the wet chamber 101.

Conductors serving to contact the parts to be cooled are sized such that conduits 66 as wide as possible are provided on the circuit board 61 for an easier heat removal. In order to utilize the circuit board 61 as well as possible and to achieve an optimum heat removal the different conductors 66 are embodied in different widths, depending on the amount of heat developing in the part the connectors contact. In the shaft 51 a longitudinal groove is formed as a cooling channel between a bottom 117 of the separating can 116 and the pump rotor 59, forcing a continuous circulation of the transportation medium even inside the separating can 116. The circuit board is arranged between a face 45 of the motor housing 44 and the bottom 117 of the separating can 116 and is held to the bottom 117 in a heat conducting contact by the head conducting foil 67.

The first housing part 103 has a first flange 130 and a first ring 131 adjacent thereto. The second housing part 104 has a second flange 140 and a second ring 141 adjacent thereto. The motor housing part is provided with a third ring 441. The second flange 140 and the second ring 141 together form a T-shape in the cross-section. Four sealing areas 133, 144, 145, and 444 are provided. The first sealing area is located on the radially exterior side of the first ring 131 at the first housing part 103. Opposite to the radially inward located side of the second ring 141 and the second housing part 104 the second sealing area 144 is located. Also the third sealing area 145 is located at the radially inward side of the second ring 141 and the second housing part 104. The fourth sealing area 444 is located opposite thereto on the radially exterior of the third ring 441 and the motor housing part 44. The second housing part 104 comprises a material permeable by laser light with a wavelength or a wavelength range. The first housing part 103 and the motor housing part 44 comprises a material absorbing the same laser light. This way, a laser beam can be guided to the seam without heating the transparent material. Here, the beam impinges the material absorbing the light and converting it into heat, thus melting the plastic and creating an intimate connection with the neighboring material.

Due to the fact that the sealing areas to be welded together are located at close proximity to each other it is easily possible to create the two seams in one device and in one processing step. The welding device may be provided with two lasers, with each laser creating one welding seam, or it may be provided with a single laser, its output beam being split into two radiation beams by a beam splitter, each of which creating one welding seam. In the example shown the laser beams are radially deflected to the pump housing.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An electric motor comprising:
   a central axis;
   a permanent magnet rotor rotatably supported around the central axis;
   a wound stator with a cylindrical stator winding and disc-shaped stator plates;
   claw poles arranged around the central axis and perpendicularly in reference to the disc-shaped stator plates;
   a tubular return ring connected to the stator plates, the return ring having a perimeter;
   caulking means for caulking the return ring to the disc-shaped stator plates, wherein the disc-shaped stator plates with claw poles are embodied in one piece;
   slots provided at least at two points at the perimeter of the return ring; and
   metal bars adjacent the slots, with the slots extending along a peripheral line and deformed radially inwardly towards the metal bars adjacent to the slots.

2. The electric motor according to claim 1, wherein the slot further comprises a radius at its end and a narrow portion in the middle.

3. The electric motor according to claim 1, wherein the return ring has first and second brims and at least one slot is arranged at the first brim of the return ring and at least one other slot is arranged in the axial direction at the second brim of the return ring.

4. The electric motor according to claim 3, further comprising a third slot in the form of a connection slot parallel to the central axis, the third slot connecting the at least one and the at least one other slots to each other in their central area, with the three slots forming an H-shape.

5. The electric motor according to claim 4, wherein the connection slot has a width that provides for seize-free assembly of the return ring on the stator plate and a fixed connection free of play between the return ring and the stator plate after the assembly.

6. The electric motor according to claim 1, wherein at least one additional slot is provided, extending along a circumferential line and open towards an edge region of the return ring and deformed radially inward.

7. The electric motor according to claim 1, characterized in that the additional slot is provided at a first end with a radius and narrows towards an open end positioned opposite thereto.

8. The electric motor according to claim 1, wherein the return ring is provided with a seam, where the two ends of the return ring are connected to each other in a fixed manner.

9. The electric motor according to claim 8, wherein the seam is off-set by 180° in reference to the connection slot.

10. The electric motor according to claim 8, wherein the seam is provided with a form fitting or material fitting connection.

11. The electric motor according to claim 10, wherein the seam is provided with matching connection means in the form of buttons or swallow tails.

12. The electric motor according to claim 1 for use with a connection wire, further comprising
- winding wire;
- a contact pin; and
- quick connectors each with a protrusion having an accepting slot and an assembly recess, each of the quick connectors being provided by the insulating body the winding wire to be connected being provided in the axial direction within the accepting slot for the connection wire and the contact pin being provided within the assembly recess.

13. An electric motor comprising:
- a central axis;
- permanent magnet rotor rotatably supported around the central axis;
- a wound stator with a cylindrical stator winding and disc-shaped stator plates, the disc-shaped stator plates being provided with evenly distributed recesses, arranged at the radially exterior edge of the stator plates;
- claw poles arranged around the central axis and perpendicularly in reference to the disc-shaped stator plates;
- a tubular return ring connected to the stator plates, the return ring having a perimeter; and caulking means for caulking the return ring to the disc-shaped stator plates, wherein the disc-shaped stator plates with claw poles are embodied in one piece.

14. An electric motor comprising:
- a central axis;
- a permanent magnet rotor rotatably supported around the central axis;
- a wound stator with a cylindrical stator winding and disc-shaped stator plates;
- claw poles arranged around the central axis and perpendicularly in reference to the disc-shaped stator plates, the claw poles being injection-molded with a plastically processed plastic material in the form of an insulating body for the stator winding, the insulating body including a fastening means for a circuit board, and the insulating body and the fastening means being of unitary construction;
- a tubular return ring connected to the stator plates, the return ring having a perimeter; and caulking means for caulking the return ring to the disc-shaped stator plates, wherein the disc-shaped stator plates with claw poles are embodied in one piece.

15. An electric motor for use with a circuit board, the electric motor comprising:
- a central axis;
- a permanent magnet rotor rotatably supported around the central axis;
- a wound stator with a cylindrical stator winding and disc-shaped stator plates;
- claw poles arranged around the central axis and perpendicularly in reference to the disc-shaped stator plates, the claw poles being injection-molded with a plastically processed plastic material in the form of an insulating body for the stator winding, the insulating body including a fastening means for a circuit board, and the insulating body and the fastening means being of unitary construction;
- a tubular return ring connected to the stator plates, the return ring having a perimeter;
- caulking means for caulking the return ring to the disc-shaped stator plates, wherein the disc-shaped stator plates with claw poles are embodied in one piece;
- winding wire;
- a contact pin; and
- quick connectors each with a protrusion having an accepting slot and an assembly recess, each of the quick connectors being provided by the insulating body the winding wire to be connected being provided in the axial direction within the accepting slot for the connection wire and the contact pin being provided within the assembly recess,
- wherein the contact pin is provided on one side with a clamping-cutting geometry and on an other side as a solder-free compression contact electrically connected to the circuit board.

* * * * *